US012753890B2

(12) United States Patent
Liao et al.

(10) Patent No.: US 12,753,890 B2
(45) Date of Patent: Oct. 6, 2026

(54) PANEL LIGHT

(71) Applicant: Xiamen PVTECH Co., Ltd., Xiamen (CN)

(72) Inventors: Sishan Liao, Xiamen (CN); Liangliang Cao, Xiamen (CN); Yanling Xiao, Xiamen (CN); Weibiao Zhong, Xiamen (CN); Haibo Hong, Xiamen (CN); Dejia Li, Xiamen (CN); Jinsheng Li, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 39 days.

(21) Appl. No.: 19/057,950

(22) Filed: Feb. 19, 2025

(65) Prior Publication Data

US 2026/0016132 A1 Jan. 15, 2026

(30) Foreign Application Priority Data

| | | |
|---|---|---|
| Jul. 12, 2024 | (CN) | 202410937559.0 |
| Jul. 12, 2024 | (CN) | 202410937560.3 |
| Jul. 12, 2024 | (CN) | 202410937562.2 |
| Jul. 12, 2024 | (CN) | 202421653247.9 |
| Jul. 12, 2024 | (CN) | 202421653251.5 |

(51) Int. Cl.
*F21S 8/00* (2006.01)
*F21S 8/04* (2006.01)
(Continued)

(52) U.S. Cl.
CPC ............... *F21S 8/043* (2013.01); *F21S 8/061* (2013.01); *F21S 8/063* (2013.01); *F21V 15/01* (2013.01); *F21V 17/08* (2013.01); *F21V 21/03* (2013.01); *F21V 23/001* (2013.01); *F21Y 2105/16* (2016.08)

(58) Field of Classification Search
CPC .......... F21V 15/01; F21V 17/08; F21V 21/03; F21V 23/001; F21S 8/043; F21S 8/061; F21S 8/063
See application file for complete search history.

(56) References Cited

U.S. PATENT DOCUMENTS

| | | | | |
|---|---|---|---|---|
| 11,849,870 | B1 * | 12/2023 | Gong | A47G 1/24 |
| 11,945,374 | B1 * | 4/2024 | Wang | B60R 11/0252 |

(Continued)

*Primary Examiner* — Gerald J Sufleta, II

(74) *Attorney, Agent, or Firm* — BruceStone LLP; Joseph A. Bruce

(57) ABSTRACT

A panel light includes: a carrier plate having two fixing portions disposed at the two ends thereof; a frame body having two first frame strips and two second frame strips spliced with each other; and two safety ropes corresponding to the first frame strips and fixing portions respectively. The first frame strips are arranged opposite to each other and corresponding to the fixing portions respectively, and the second frame strips are arranged opposite to each other. Each first frame strip has an L-shaped hook portion, so the cross-section of the first frame strip is inverted U-shaped, and the L-shaped hook portion has an opening. The two ends of each safety rope are fixed to the first frame strip and the fixing portion corresponding thereto. Each fixing portions is engaged with the L-shaped hook portion of the first frame strip corresponding thereto via the opening of the L-shaped hook portion.

20 Claims, 13 Drawing Sheets

(51) Int. Cl.

| | |
|---|---|
| ***F21S 8/06*** | (2006.01) |
| ***F21V 15/01*** | (2006.01) |
| ***F21V 17/08*** | (2006.01) |
| ***F21V 21/03*** | (2006.01) |
| ***F21V 23/00*** | (2015.01) |
| *F21Y 105/16* | (2016.01) |

(56) References Cited

U.S. PATENT DOCUMENTS

2024/0318809 A1* 9/2024 Fannin ................ F21V 19/0035
2024/0411080 A1* 12/2024 Zhu ...................... G02B 6/0083

* cited by examiner

PANEL LIGHT

BACKGROUND OF THE INVENTION

1. Field of the Invention

The present invention relates to a lighting device, in particular to a panel light.

2. Description of the Prior Art

Some currently available panel lights are mounted on the ceiling via a ceiling-mounted frame. However, such mounting structures are bulky and heavy, resulting in low installation efficiency and negatively affecting the appearance of the panel light. Besides, the high cost of these mounting structures significantly limits the application of panel lights.

Some other currently available panel lights can be installed on the ceiling using a mounting structure that includes a carrier plate and hooks. While this mounting structure improves the appearance compared to ceiling-mounted lights, the installation process is relatively complex, leading to low installation efficiency. Furthermore, this mounting structure lacks sufficient safety.

Additionally, some currently available panel lights can be installed on the ceiling via a metal frame with multiple mounting holes. However, this mounting structure requires several people to complete the installation process, thereby increasing labor costs. Moreover, this structure also affects the appearance of the panel lights.

SUMMARY OF THE INVENTION

One embodiment of the present invention provides a panel light, which includes a carrier plate, a frame body and two safety ropes. The carrier plate has two fixing portions disposed at the two ends thereof. The frame body has two first frame strips and two second frame strips spliced with each other. The first frame strips are arranged opposite to each other and corresponding to the fixing portions respectively, and the second frame strips are arranged opposite to each other. Each first frame strip has an L-shaped hook portion, such that the cross-section of the first frame strip is inverted U-shaped, and the L-shaped hook portion has an opening. The safety ropes are corresponding to the first frame strips respectively and corresponding to the fixing portions respectively. The two ends of each safety rope are fixed to the first frame strip and the fixing portion corresponding thereto. When the fixing portions of the carrier plate are disposed at the openings of the L-shaped hook portions of the first frame strips respectively, the safety ropes are in taut state. Each fixing portions is engaged with the L-shaped hook portion of the first frame strip corresponding thereto via the opening of the L-shaped hook portion.

Another embodiment of the present invention provides a panel light, which includes a carrier plate, a frame body and a lamp body. The carrier plate has two fixing portions disposed at the two ends of the carrier plate, and the fixing portions are U-shaped. The frame body has two first frame strips and two second frame strips spliced with each other. The first frame strips are arranged opposite to each other and corresponding to the fixing portions respectively, and the second frame strips are arranged opposite to each other. Each of the first frame strips has an L-shaped hook portion, such that the cross-section of the first frame strip is inverted U-shaped, and the L-shaped hook portion has an opening. The lamp body is disposed within the frame body. Each of the fixing portions is engaged with the L-shaped hook portion of the first frame strip corresponding thereto via the opening of the L-shaped hook portion.

Yet another embodiment of the present invention provides a panel light, which includes a carrier plate and a frame body. The carrier plate has two fixing portions disposed at the two ends of the carrier plate. Each fixing portion is U-shaped and includes an L-shaped supporting portion and a wall portion connected to each other. The L-shaped supporting portion is connected to the carrier plate. The wall portion includes a protruding portion and two recessed portions. The protruding portion extends in the direction toward the carrier plate, and the two recessed portions are disposed on the two sides of the protruding portion respectively. The top end of the protruding portion is flat, while the two sides of the protruding portion are slanted. The frame body has two first frame strips and two second frame strips spliced with each other. The two first frame strips are arranged opposite to each other and corresponding to the two fixing portions respectively. The two second frame strips are also arranged opposite to each other. Each first frame strip includes an L-shaped hook portion and a locking member, such that the cross-section of the first frame strip is inverted U-shaped. The L-shaped hook portion has an opening. The locking member is fixed to the L-shaped hook portion and engaged with one of the recessed portions of the wall portion of the fixing portion corresponding thereto. The lamp body is disposed within the frame body. Each fixing portion is engaged with the L-shaped hook portion of the first frame strip corresponding thereto via the opening of the L-shaped hook portion.

Yet another embodiment of the present invention provides a panel light, which includes a carrier plate, a frame body, and two supporting plates. The carrier plate has two fixing portions disposed at the two ends of the carrier plate. The fixing portions are U-shaped. The frame body has two first frame strips and two second frame strips spliced with each other. The two first frame strips are arranged opposite to each other and correspond to the two fixing portions respectively. The two second frame strips are also arranged opposite to each other. Each first frame strip includes an L-shaped hook portion, such that the cross-section of the first frame strip is inverted U-shaped. The L-shaped hook portion has an opening. The two supporting plates are corresponding to the two first frame strips respectively and corresponding to the two fixing portions respectively. The two ends of each supporting plates are fixed to the first frame strip and fixing portion respectively. When the two fixing portions of the carrier plate are disposed at the openings of the L-shaped hook portions of the two first frame strips, the two supporting plates are parallel to the frame body and the carrier plate. Each fixing portion is engaged with the L-shaped hook portion opening of the first frame strip corresponding thereto via the opening of the L-shaped hook portion.

Yet another embodiment of the present invention provides a panel light, which includes a carrier plate, a frame body, and a junction box. The carrier plate has two fixing portions disposed at the two ends of the carrier plate, a wiring hole, and a plurality of fixing holes. The fixing portions are U-shaped. The fixing holes are arranged around the wiring hole and include a plurality of first fixing holes and a plurality of second fixing holes. The centers of the first fixing holes can be connected to form a first circle, while the centers of the second fixing holes can be connected to form a second circle. The diameter of the first circle is different from the diameter of the second circle. The frame body has two first frame strips and two second frame strips spliced with each other. The two first frame strips are arranged opposite to each other and corresponding to the two fixing portions respectively. The two second frame strips are also arranged opposite to each other. Each first frame strip includes an L-shaped hook portion, such that the cross-section of the first frame strip is inverted U-shaped. The L-shaped hook portion has an opening. The junction box is disposed on the carrier plate at a location corresponding to the wiring hole, and the junction box is fixed to the carrier plate through the first fixing holes or the second fixing holes. The wiring hole communicates with the internal space of the junction box. Each fixing portion is engaged with the L-shaped hook portion opening of the first frame strip corresponding thereto via the opening of the L-shaped hook portion.

The panel light in accordance with the embodiments of the present invention may have the following advantages:

(1) In one embodiment of the present invention, the panel light includes a carrier plate, a frame body and two safety ropes. The carrier plate has two fixing portions disposed at the two ends thereof. The frame body has two first frame strips and two second frame strips spliced with each other. The first frame strips are arranged opposite to each other and corresponding to the fixing portions respectively, and the second frame strips are arranged opposite to each other. Each first frame strip has an L-shaped hook portion, such that the cross-section of the first frame strip is inverted U-shaped, and the L-shaped hook portion has an opening. The safety ropes are corresponding to the first frame strips respectively and corresponding to the fixing portions respectively. The two ends of each safety rope are fixed to the first frame strip and the fixing portion corresponding thereto. When the fixing portions of the carrier plate are disposed at the openings of the L-shaped hook portions of the first frame strips respectively, the safety ropes are in taut state. Each fixing portions is engaged with the L-shaped hook portion of the first frame strip corresponding thereto via the opening of the L-shaped hook portion. The user can first fix the carrier plate to the ceiling and hang the frame body via the two safety ropes, such that the frame body to remain suspended at a distance from the carrier plate. At this point, the user can independently perform a wiring operation, and after completing the wiring operation, assemble the frame body with the carrier plate. This temporary load-bearing structural design significantly simplifies the installation process, so labor costs can be effectively reduced.

(2) In one embodiment of the present invention, the panel light also has a special automatic alignment structure. When the fixing portions of the carrier plate are disposed at the openings of the L-shaped hook portions of the two first frame strips respectively, the safety ropes are in taut state. Therefore, when the frame body is suspended, the user can move the frame body to ensure that the two safety ropes are taut, such that the fixing portions can enter the openings of the L-shaped hook portions of the two first frame strips. The user can then move the frame body horizontally to engage which with the carrier plate. Therefore, the user can independently perform the assembly process so as to further simplify installation and reducing labor costs.

(3) In one embodiment of the present invention, the cross-sections of the two first frame strips of the panel light are inverted U-shaped, while the two fixing portions of the carrier plate are U-shaped. The U-shaped installation structure formed by the U-shaped fixing portions and the inverted U-shaped first frame strips allows the carrier plate to combine with the frame body through a simple structural design, which can significantly reduce the cost of the panel light. Thus, the panel light can meet the requirements of various applications.

(4) In one embodiment of the present invention, the panel light has a special automatic locking structure. Each fixing portion includes an L-shaped supporting portion and a wall portion. The wall portion is connected to the L-shaped supporting portion, and the L-shaped supporting portion is connected to the carrier plate. The wall portion includes a protruding portion and two recessed portions. The protruding portion extends in the direction toward the carrier plate, and the two recessed portions are disposed on the two sides of the protruding portion. Each first frame strip also includes a locking member. The locking member is fixed to the L-shaped hook portion of the first frame strip and engaged with one of the recessed portions of the wall portion of the corresponding fixing portion. This automatic locking structure provides an automatic locking function after the frame body and carrier plate are engaged with each other in order to secure the two first frame strips of the frame body to the fixing portions of the carrier plate. This automatic locking structure prevents the frame body from separating from the carrier plate and effectively enhances the structural stability and safety of the panel light.

(5) In one embodiment of the present invention, the panel light has a junction box matching structure. Via this junction box matching structure, the panel light can accommodate junction boxes of different sizes, such that the panel light can be more flexible in use. Consequently, the panel light achieves greater practicality.

(6) In one embodiment of the present invention, the panel light features a U-shaped installation structure without mounting holes, enabling the carrier plate to combine with the frame body through a simple structural design and remain concealed within the frame body. As a result, the panel light achieves a more minimalistic and aesthetically pleasing appearance. This effectively enhances the interior space of buildings, providing users with an excellent user experience.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
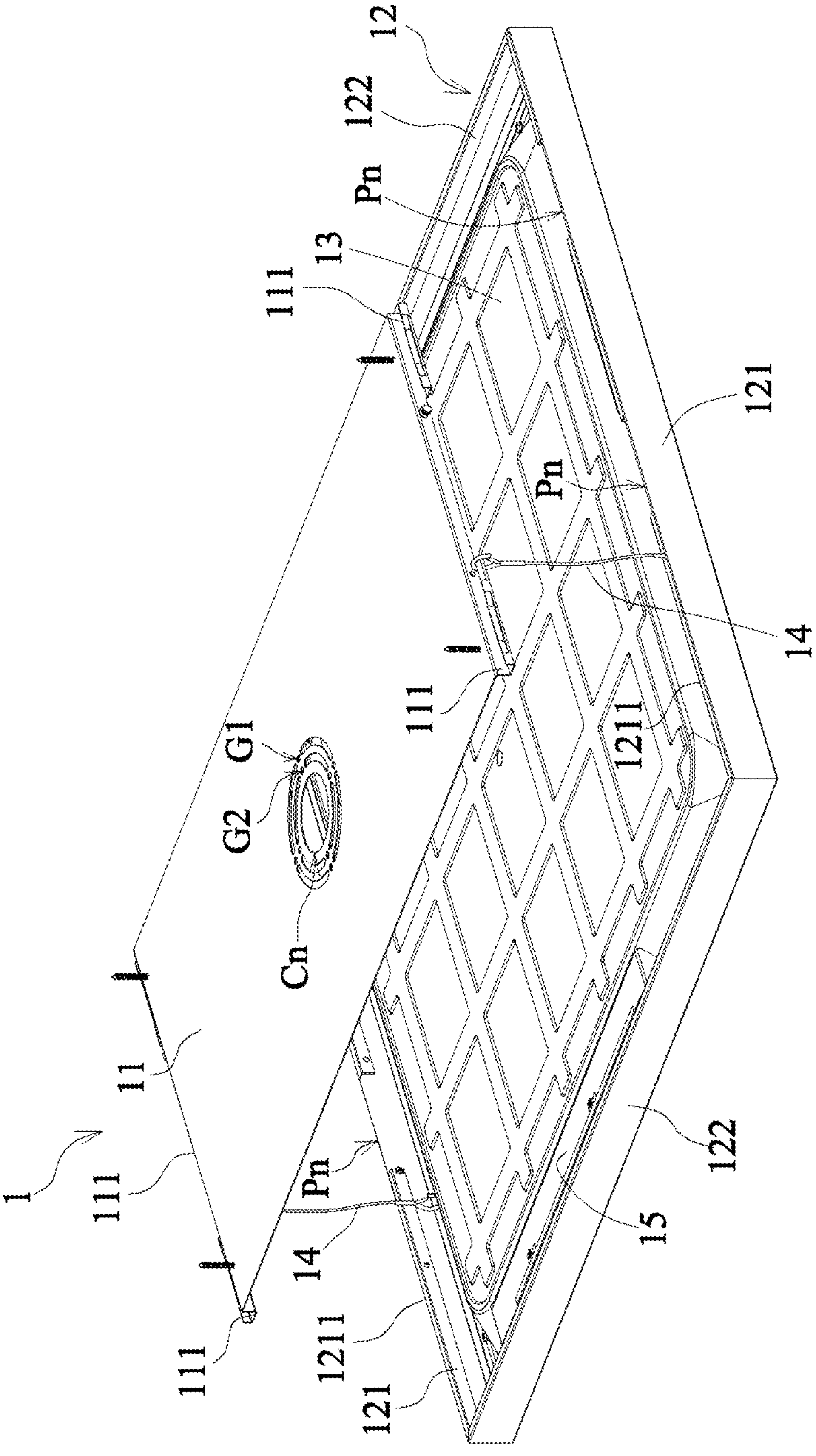
FIG. 1 is an exploded view of a panel light in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
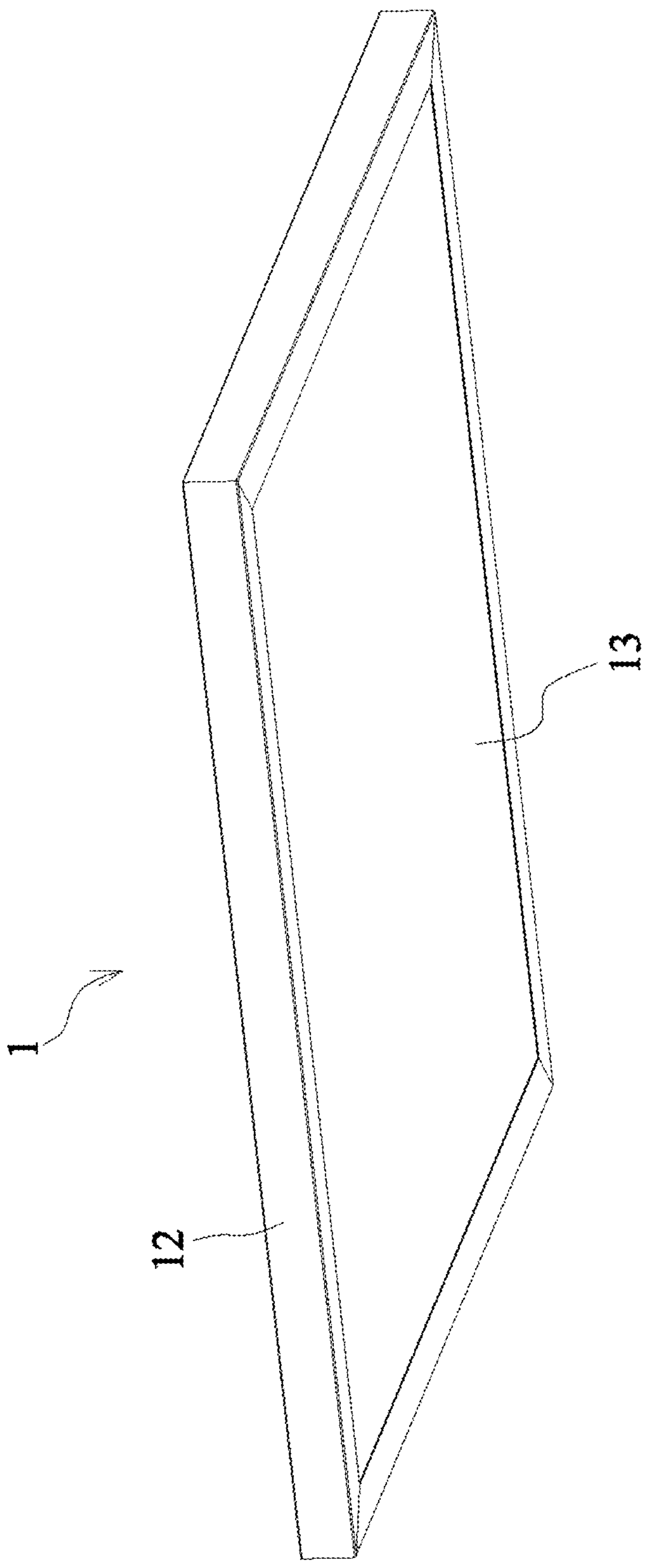
FIG. 2 is a perspective view of the panel light in accordance with one embodiment of the present invention.
Figure 3:
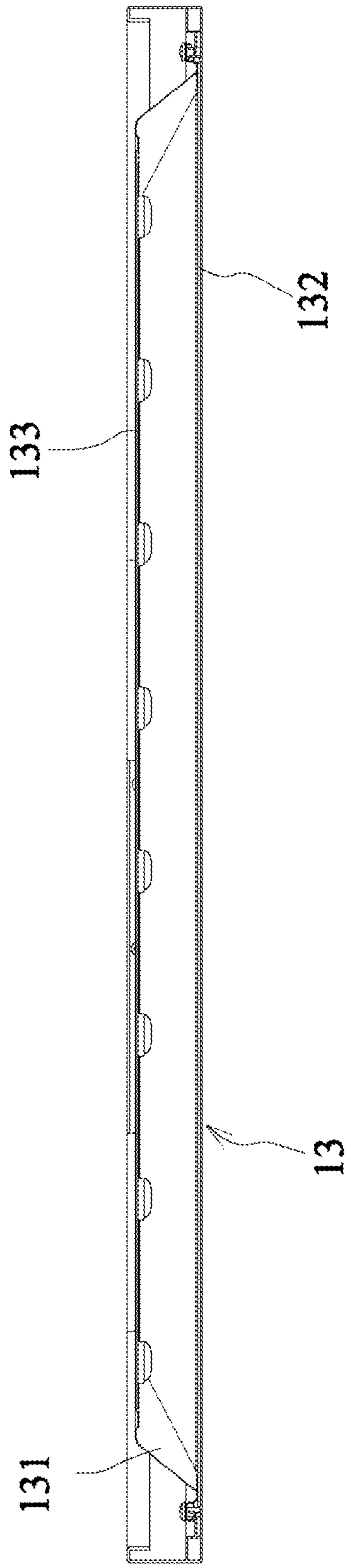
FIG. 3 is a sectional view of a lamp body of the panel light in accordance with one embodiment of the present invention.
Figure 4:
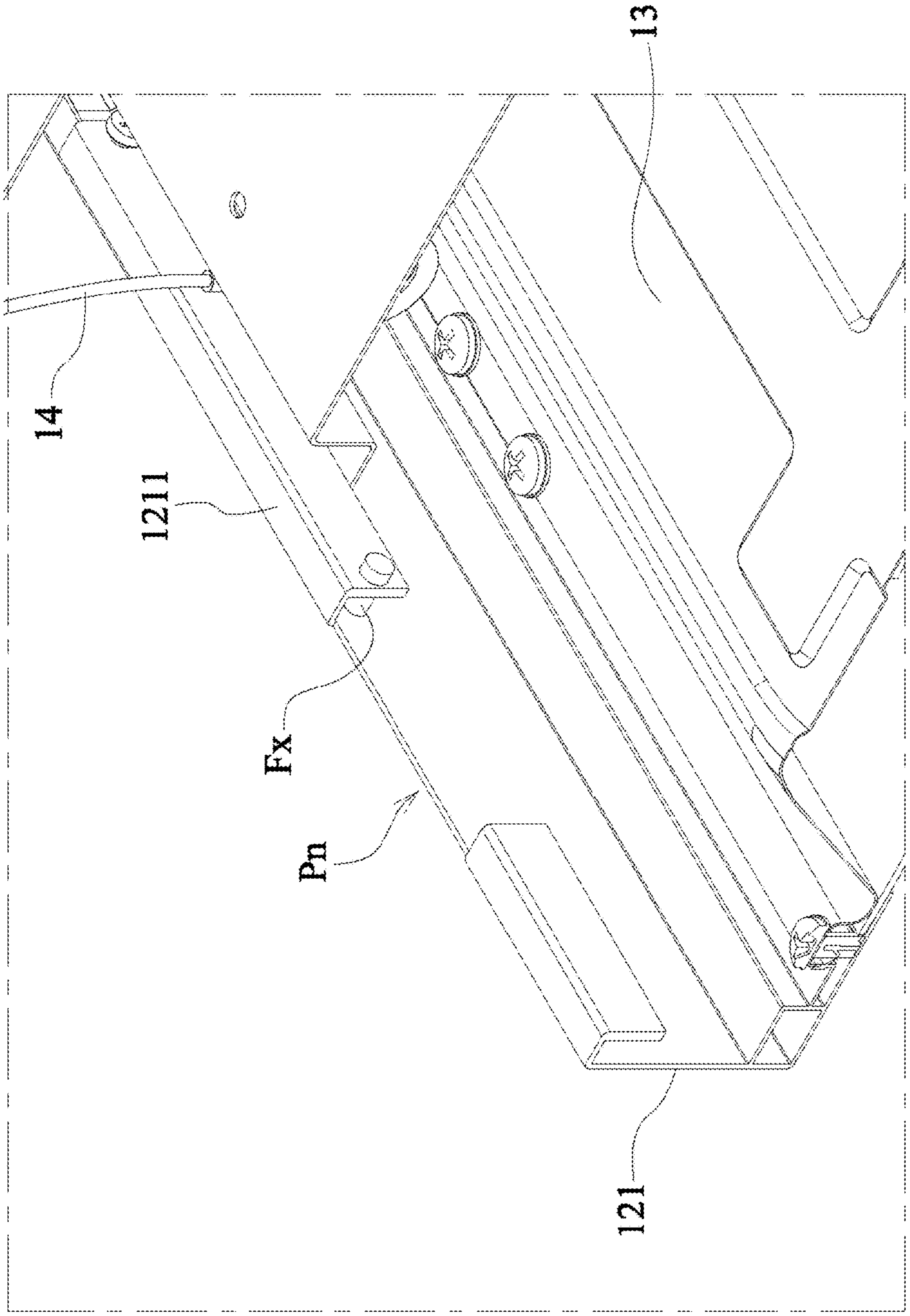
FIG. 4 is a partial enlargement view of the panel light in accordance with one embodiment of the present invention.

Please refer to FIG. 1, FIG. 2, FIG. 3, and FIG. 4. FIG. 1 is an exploded view of a panel light in accordance with one embodiment of the present invention. FIG. 2 is a perspective view of the panel light in accordance with one embodiment of the present invention. FIG. 3 is a sectional view of a lamp body of the panel light in accordance with one embodiment of the present invention. FIG. 4 is a partial enlargement view of the panel light in accordance with one embodiment of the present invention. As shown in FIG. 1, FIG. 2, FIG. 3, and FIG. 4, the panel light 1 includes a carrier plate 11, a frame body 12, a lamp body 13, two safety ropes 14, and a power supply module 15.

The carrier plate 11 has a plurality of fixing portions 111 disposed at the two ends of the carrier plate 11, and the fixing portions 111 are U-shaped. There are at least two fixing portions 111. The carrier plate 11 also has a wiring hole Cn and a plurality of fixing holes arranged around the wiring hole Cn. The fixing holes include four first fixing holes G1 and four second fixing holes G2. The numbers of the first fixing holes G1 and the second fixing holes G2 can be adjusted as needed. In this embodiment, there are four fixing portions 111. In another embodiment, the number of fixing portions 111 can exceed four and can be adjusted based on actual needs. In one embodiment, the carrier plate 11 can be made of metal, such as aluminum, iron, copper, or stainless steel. In another embodiment, the carrier plate 11 can be made of plastic.

The frame body 12 includes two first frame strips 121 and two second frame strips 122. These two first frame strips 121 and two second frame strips 122 are spliced with each other to form the frame body 12. The two first frame strips 121 are arranged opposite to each other and correspond to the four fixing portions 111. Each first frame strip 121 has an L-shaped hook portion 1211, such that the cross-section of the first frame strip 121 is inverted U-shaped. At least one first frame strip 121 includes a locking member Fx fixed to the L-shaped hook portion 1211 of the first frame strip 121. In one embodiment, the frame body 12 can be made of metal, such as aluminum, iron, copper, or stainless steel. In another embodiment, the frame body 12 can be made of plastic. The L-shaped hook portion 1211 has an opening Pn, such that each fixing portion 111 can be engaged with the L-shaped hook portion 1211 of the first frame strip 121 corresponding thereto via the opening Pn of the L-shaped hook portion 1211. In another embodiment, each first frame strip 121 has a locking member Fx.

The lamp body 13 is disposed within the frame body 12. The lamp body 13 includes a back plate 131, a light cover 132, and a light source board 133. The light source board 133 is installed on the back plate 131. The light cover 132 is attached to the back plate 131 and covers the light source board 133. In one embodiment, the light source board 133 includes a circuit board and a plurality of light sources (e.g., LEDs). In another embodiment, the light source board 133 can be replaced by light bulbs, fluorescent tubes, or other currently available light sources.

The power supply module 15 is disposed within the frame body 12 and is electrically connected to the light source board 133. In one embodiment, the power supply module 15 includes rectifier circuits, filter circuits, LED drivers, and similar components. In another embodiment, the power supply module 15 can be a power supplier for light bulbs or fluorescent tubes.

The two safety ropes 14 are corresponding to the two first frame strips 121, and also corresponding to the four fixing portions 111. The two ends of each safety rope 14 are fixed to the corresponding first frame strip 121 and fixing portion 111.

The embodiment just exemplifies the present invention and is not intended to limit the scope of the present invention; any equivalent modification and variation according to the spirit of the present invention is to be also included within the scope of the following claims and their equivalents.

Figure 5:
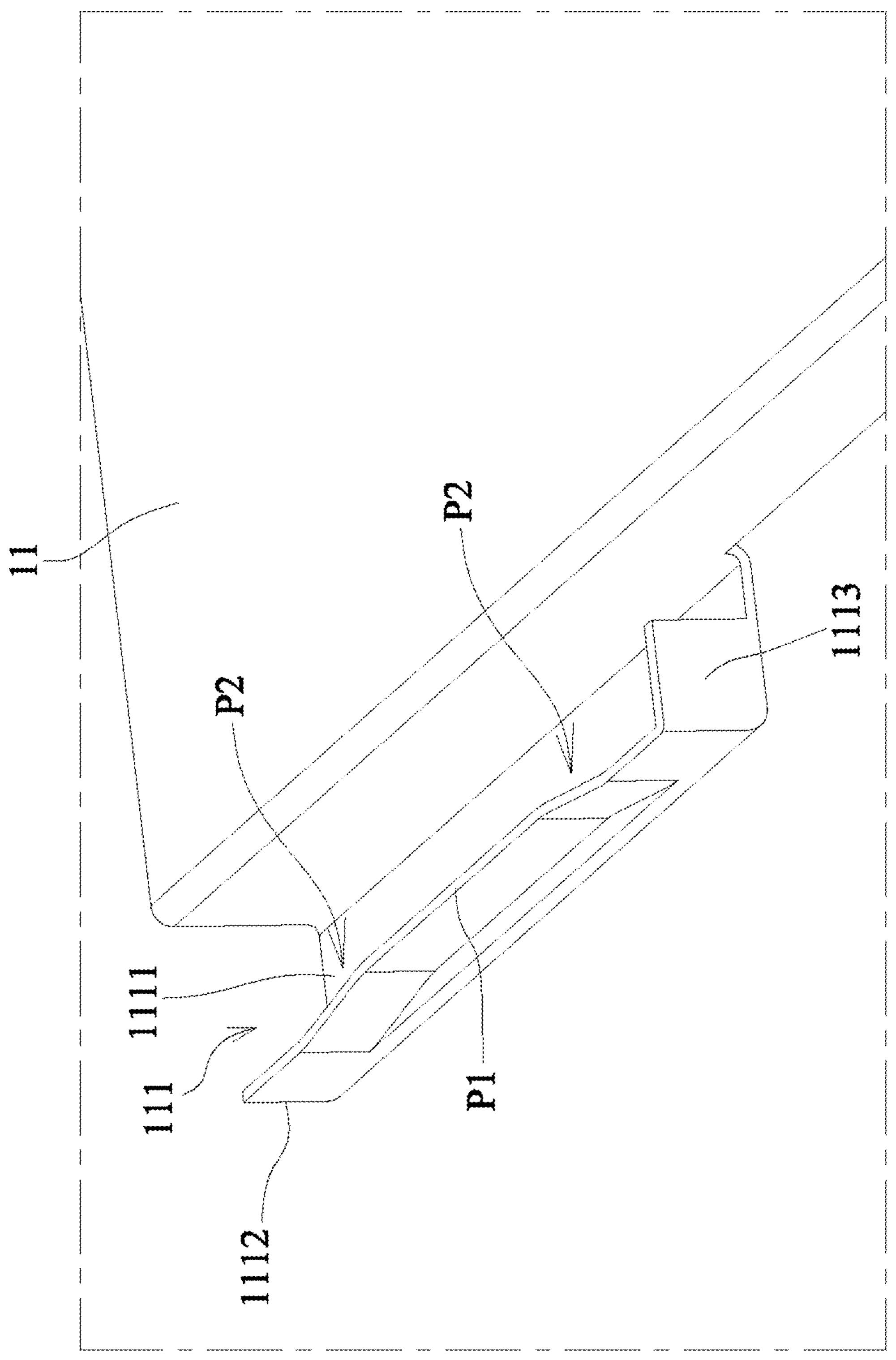
FIG. 5 is a partial enlargement view of a carrier plate of the panel light in accordance with one embodiment of the present invention.

Please refer to FIG. 5, which is a partial enlargement view of a carrier plate of the panel light in accordance with one embodiment of the present invention. As shown in FIG. 5, each fixing portion 111 of the carrier plate 11 includes an L-shaped supporting portion 1111 and a wall portion 1112. The wall portion 1112 is connected to the L-shaped supporting portion 1111, and the L-shaped supporting portion 1111 is connected to the carrier plate 11. At least one fixing portion 111 includes a blocking plate 1113, which is disposed at one end of the fixing portion 111. In this embodiment, the blocking plate 1113 is disposed on the wall portion 1112 of the fixing portion 111. In another embodiment, the blocking plate 1113 may also be disposed on the L-shaped supporting portion 1111 of the fixing portion 111. The wall portion 1112 includes a protruding portion P1 and two recessed portions P2. The protruding portion P1 extends in the direction toward the carrier plate 11, and the two recessed portions P2 are disposed on the sides of the protruding portion P1.

The embodiment just exemplifies the present invention and is not intended to limit the scope of the present invention; any equivalent modification and variation according to the spirit of the present invention is to be also included within the scope of the following claims and their equivalents.

Figure 6:
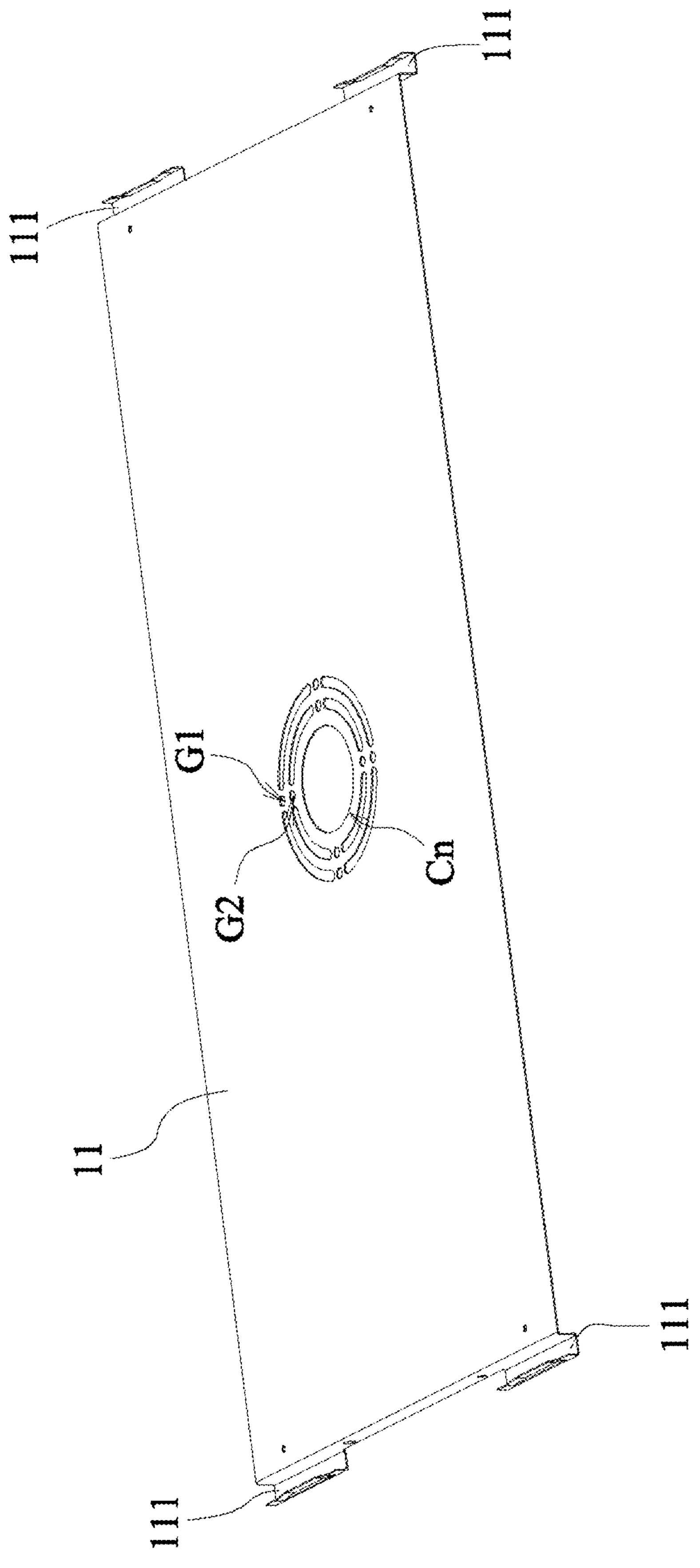
FIG. 6 is a perspective view of the carrier plate of the panel light in accordance with one embodiment of the present invention.

Please refer to FIG. 6, which is a perspective view of the carrier plate of the panel light in accordance with one embodiment of the present invention. As shown in FIG. 6, the carrier plate 11 has a wiring hole Cn and a plurality of fixing holes arranged around the wiring hole Cn. The fixing holes include four first fixing holes G1 and four second fixing holes G2. The numbers of the first fixing holes G1 and second fixing holes G2 can be adjusted as needed.

The centers of the four first fixing holes G1 can be connected to form a first circle, while the centers of the four second fixing holes G2 can be connected to form a second circle. The diameter of the first circle is different from that of the second circle. In this embodiment, the diameter of the first circle is greater than that of the second circle. In another embodiment, the diameter of the first circle is less than that of the second circle.

The embodiment just exemplifies the present invention and is not intended to limit the scope of the present invention; any equivalent modification and variation according to the spirit of the present invention is to be also included within the scope of the following claims and their equivalents.

Figure 7:
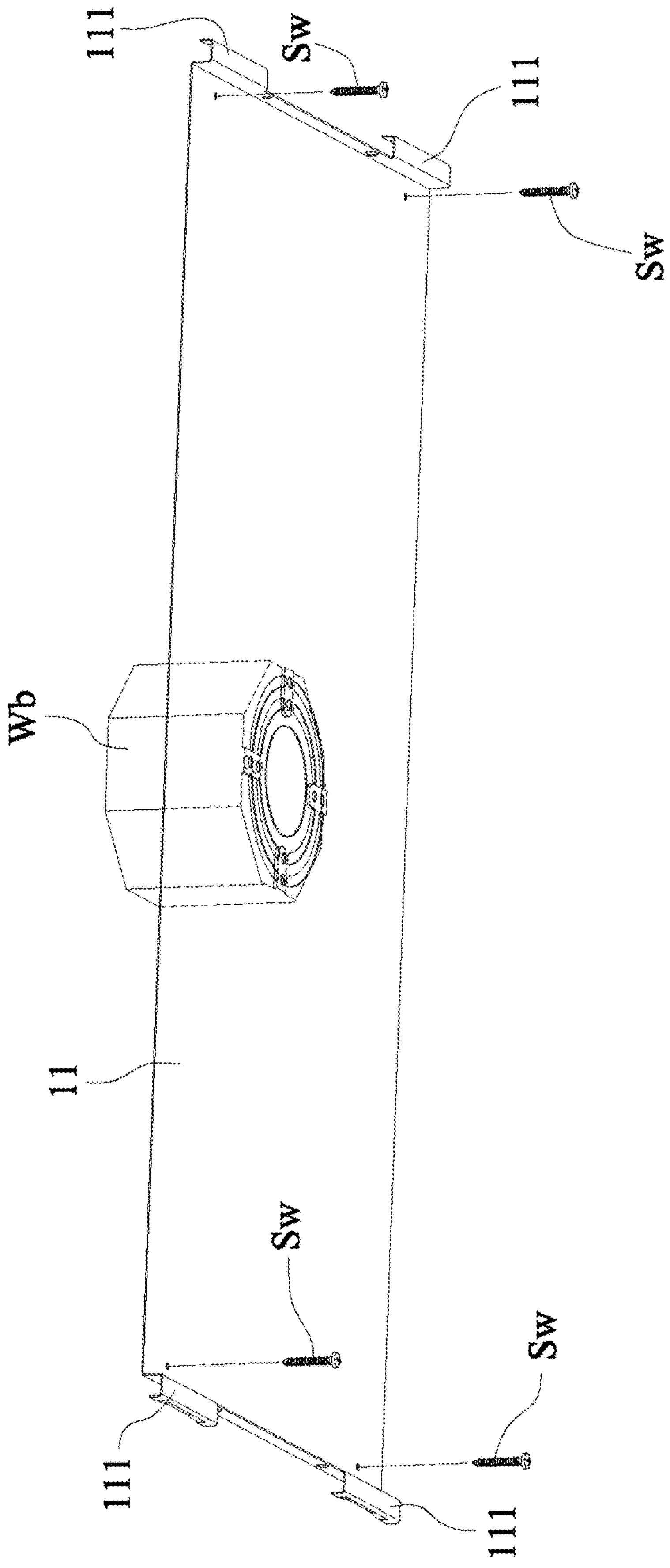
FIG. 7 is a schematic view of a combination of the carrier plate and a junction box of the panel light in accordance with one embodiment of the present invention.

Please refer to FIG. 7, which a schematic view of a combination of the carrier plate and a junction box of the panel light in accordance with one embodiment of the present invention. As shown in FIG. 7, the carrier plate 11 can be fixed to the ceiling via a plurality of fasteners Sw (e.g., screws, nails, etc.). The panel light 1 also includes a junction box Wb, which can also be fixed to the carrier plate 11 via a plurality of fasteners and the aforementioned fixing holes. The junction box Wb is disposed on the carrier plate 11 at the location corresponding to the wiring hole Cn, and the junction box Wb can be fixed to the carrier plate 11 via the four first fixing holes G1 or the second fixing holes G2. In this way, the wiring hole Cn can communicate with the internal space of the junction box Wb. The first fixing holes G1 can be used to secure larger junction boxes Wb, while the second fixing holes G2 can be used to secure smaller junction boxes Wb. In this embodiment, the number of fasteners Sw is four. In another embodiment, the number of fasteners Sw can be adjusted based on actual needs.

Through the above-mentioned junction box matching structure, junction boxes Wb of different sizes can be secured to the carrier plate 11. As a result, the panel light 1 can be compatible with junction boxes Wb of various sizes, so the practicality of the panel light 1 can be enhanced.

The embodiment just exemplifies the present invention and is not intended to limit the scope of the present invention; any equivalent modification and variation according to the spirit of the present invention is to be also included within the scope of the following claims and their equivalents.

Figure 8:
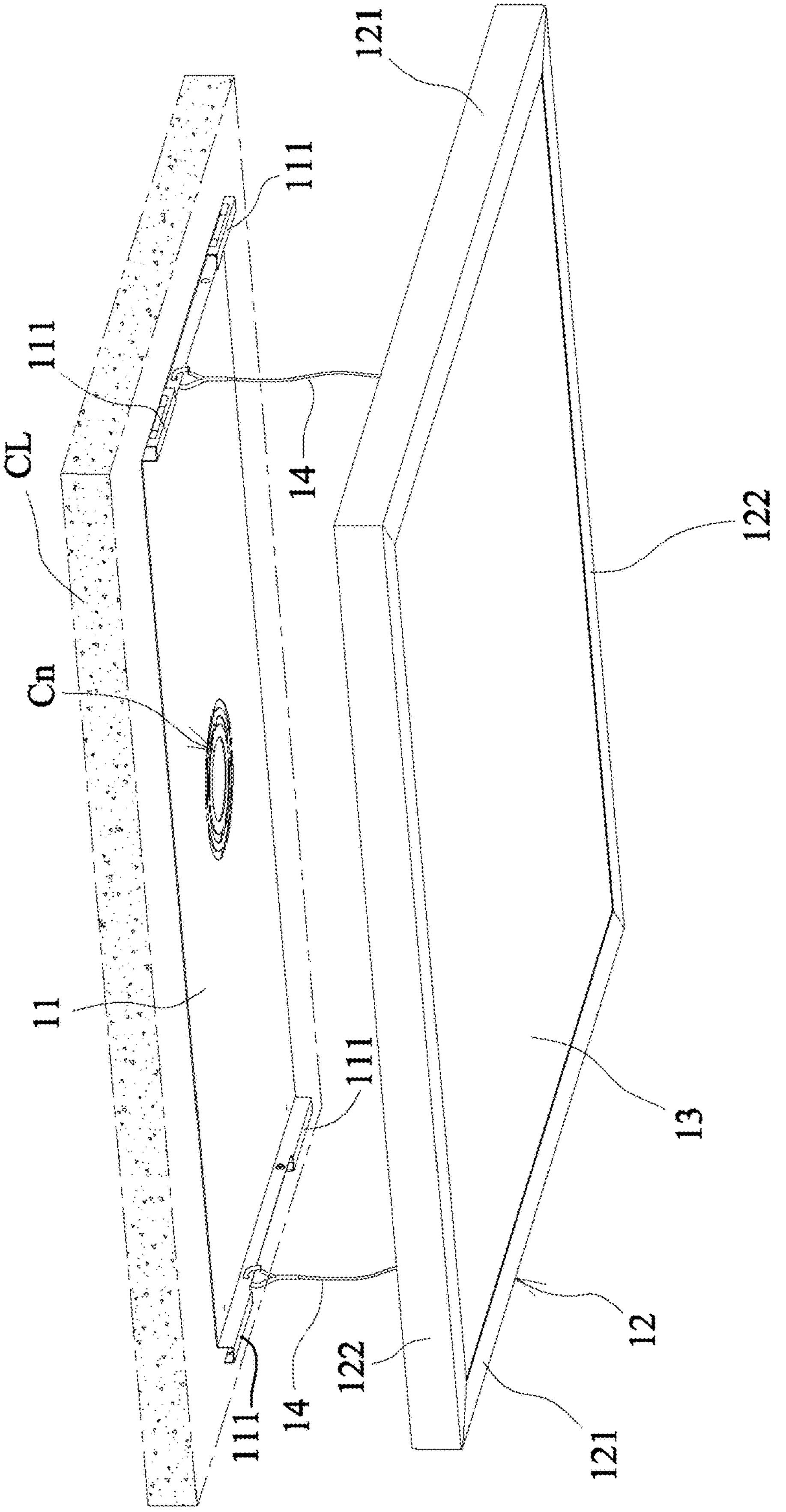
FIG. 8 is a first schematic view of an installation process of the panel light in accordance with one embodiment of the present invention.

Please refer to FIG. 8, which is a first schematic view of an installation process of the panel light in accordance with one embodiment of the present invention. As shown in FIG. 8, the user can first fix the carrier plate 11 to the ceiling CL via several fasteners Sw and align the wiring hole Cn of the carrier plate 11 with the junction box Wb. The user can then secure the junction box Wb to the carrier plate 11. The frame body 12 can be suspended from the carrier plate 11 via the two safety ropes 14, such that the frame body 12 can remain in a suspended state at a distance from the carrier plate 11. At this point, the user can independently perform a wiring operation. This temporary structural load-bearing design significantly simplifies the installation process with a view to effectively reducing labor costs.

The embodiment just exemplifies the present invention and is not intended to limit the scope of the present invention; any equivalent modification and variation according to the spirit of the present invention is to be also included within the scope of the following claims and their equivalents.

Figure 9:
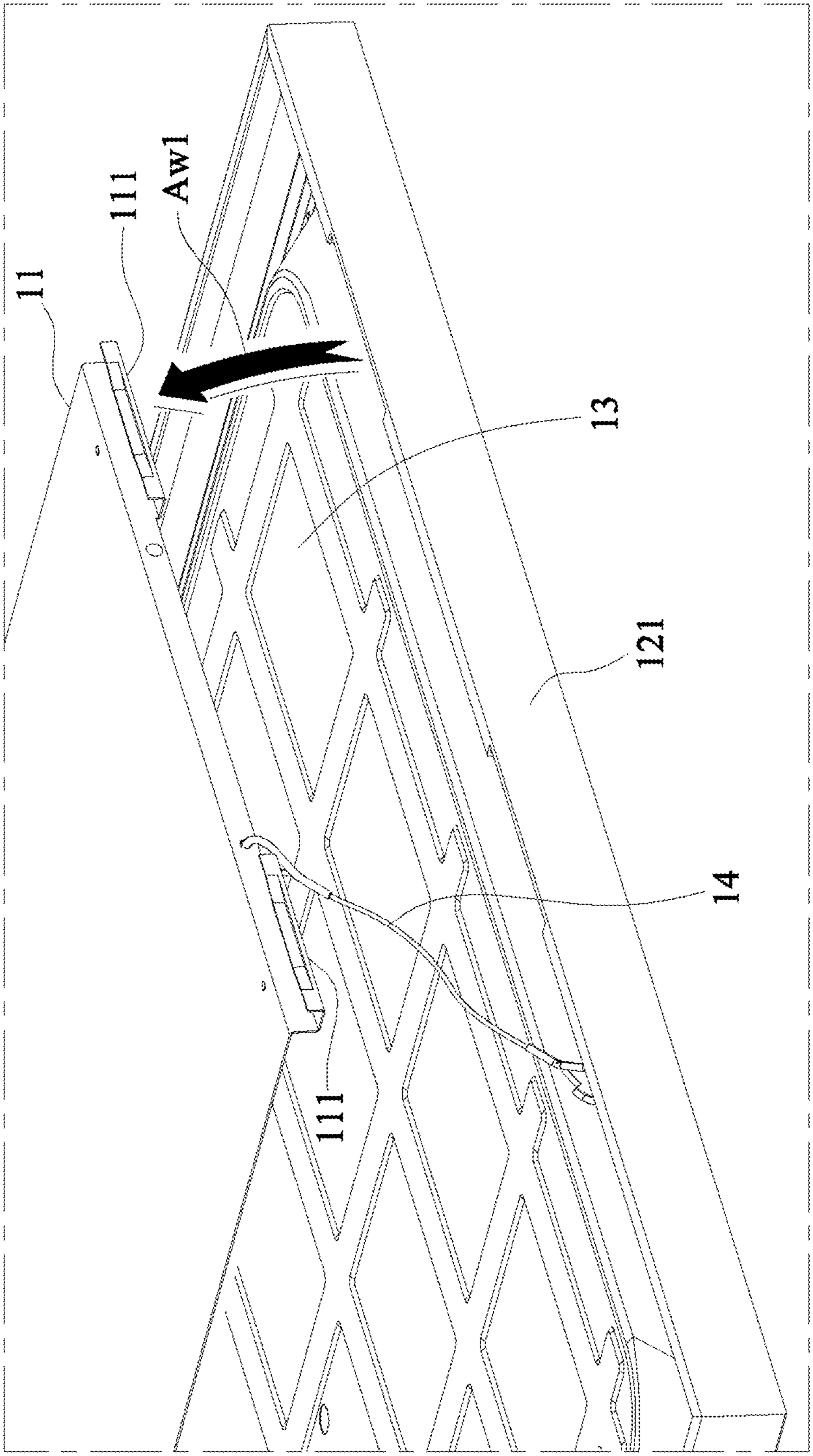
FIG. 9 is a second schematic view of the installation process of the panel light in accordance with one embodiment of the present invention.
Figure 10:
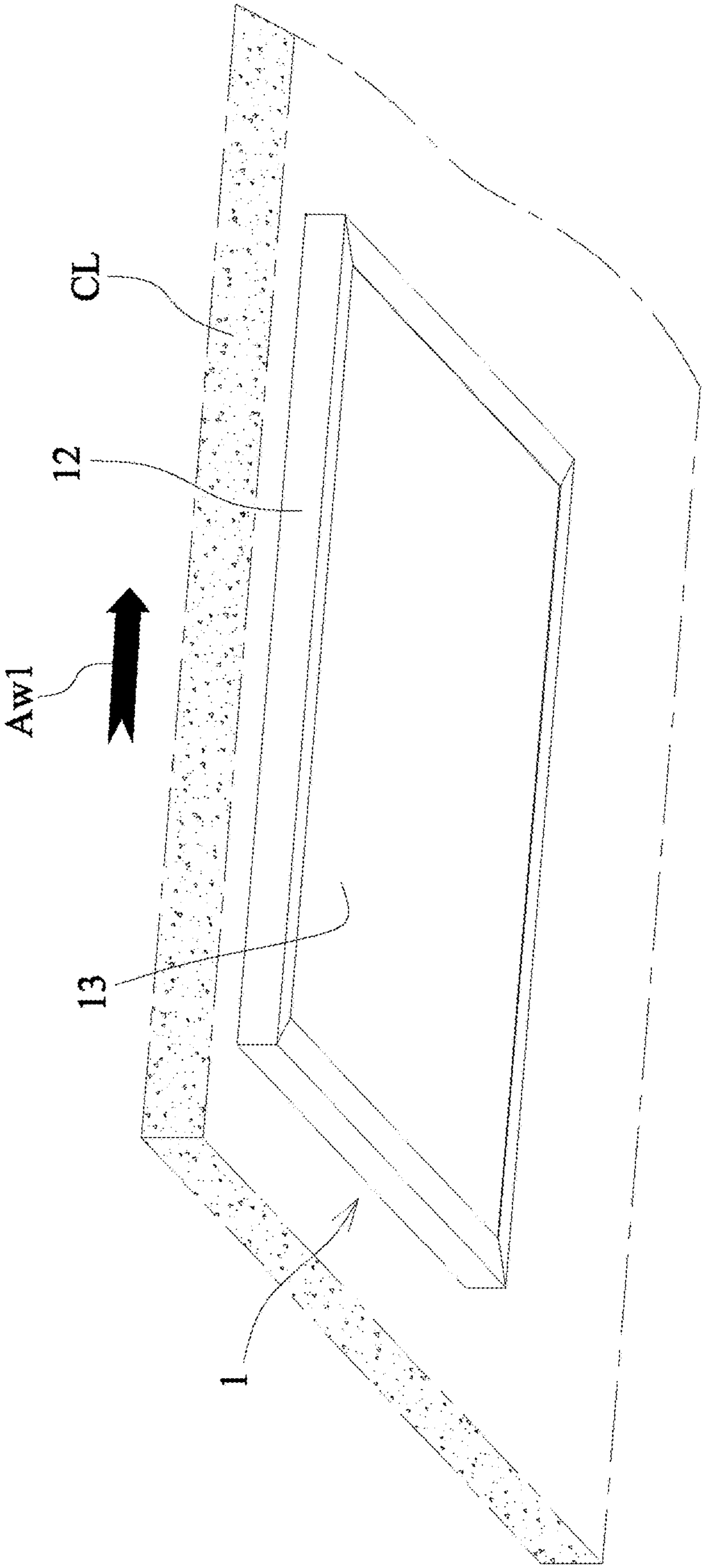
FIG. 10 is a third schematic view of the installation process of the panel light in accordance with one embodiment of the present invention.

Please refer to FIG. 9 and FIG. 10. FIG. 9 is a second schematic view of the installation process of the panel light in accordance with one embodiment of the present invention. FIG. 10 is a third schematic view of the installation process of the panel light in accordance with one embodiment of the present invention. As shown in FIG. 9, after completing the wiring operation, the user can move the frame body 12 in the direction of the arrow Aw1 to make the frame body 12 approach the carrier plate 11 and tighten the two safety ropes 14. The four fixing portions 111 then enter the openings Pn of the L-shaped hook portions 1211 of the two first frame strips 121. At this point, the two safety ropes 14 are in taut state.

The embodiment just exemplifies the present invention and is not intended to limit the scope of the present invention; any equivalent modification and variation according to the spirit of the present invention is to be also included within the scope of the following claims and their equivalents.

As shown in FIG. 10, the user can then move the frame body 12 horizontally in the direction of the arrow Aw2 to make the frame body 12 move toward the carrier plate 11. The L-shaped hook portions 1211 of the two first frame strips 121 are then engaged with the four fixing portions 111 of the carrier plate 11, thereby securing the frame body 12 to the carrier plate 11.

As previously stated, the panel light 1 has a special automatic alignment structure. When the fixing portions 111 of the carrier plate 11 are disposed in the openings Pn of the L-shaped hook portions 1211 of the two first frame strips 121, the two safety ropes 14 are tightened. Therefore, when the frame body 12 is suspended, the user can move the frame body 12 to tighten the two safety ropes 14 and align the four fixing portions with the openings Pn of the two first frame strips. The user can then move the frame body 12 horizontally to make the frame body 12 be engaged with the carrier plate 11. Accordingly, the user can independently perform an assembly operation, further simplifying the installation process and reducing labor costs.

The embodiment just exemplifies the present invention and is not intended to limit the scope of the present invention; any equivalent modification and variation according to the spirit of the present invention is to be also included within the scope of the following claims and their equivalents.

Figure 11:
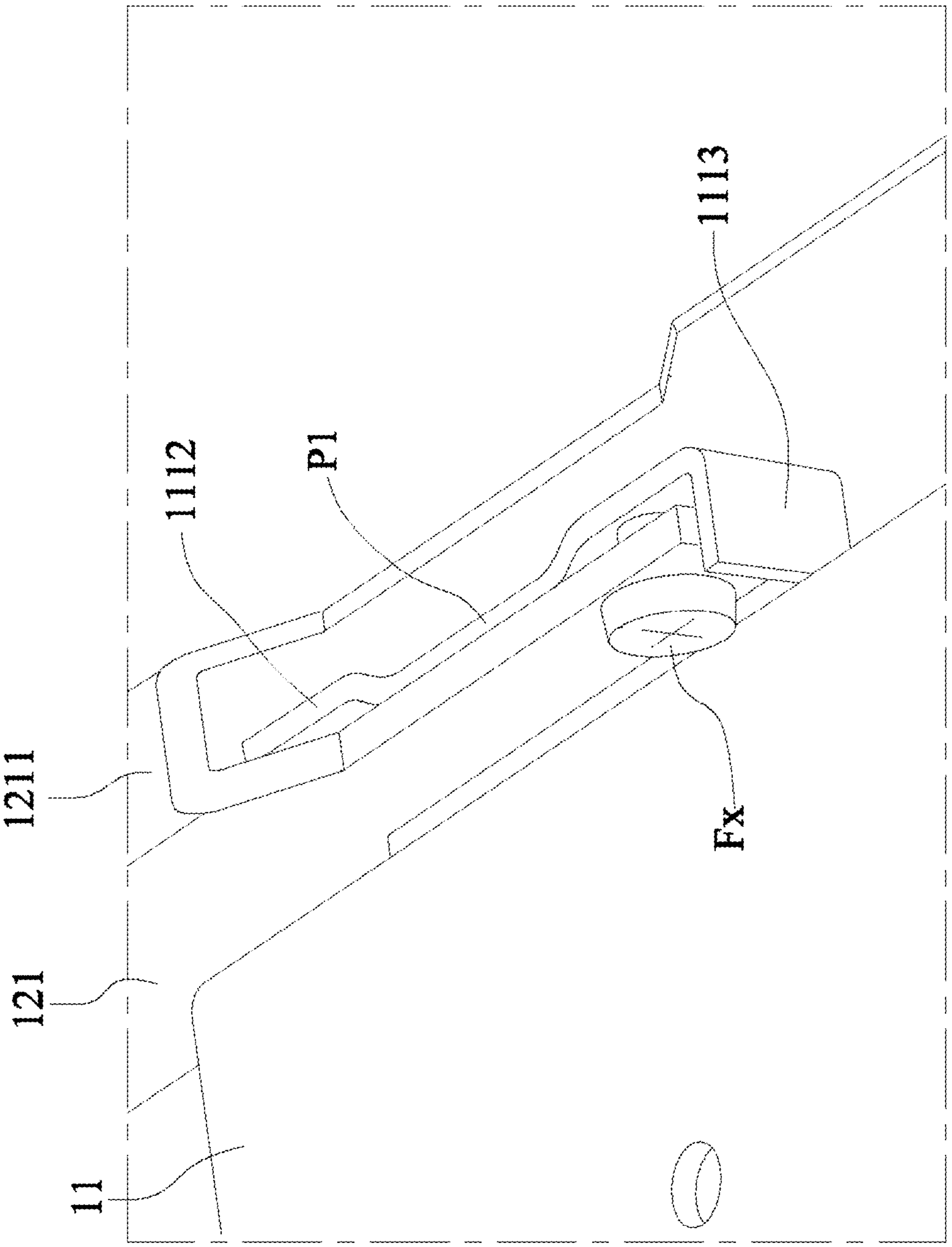
FIG. 11 is a fourth schematic view of the installation process of the panel light in accordance with one embodiment of the present invention.

Please refer to FIG. 11, which is a fourth schematic view of the installation process of the panel light in accordance with one embodiment of the present invention. Please also refer to FIG. 4 and FIG. 5. As shown in FIG. 11, when the frame body 12 moves toward the carrier plate 11, the locking member Fx fixed on the L-shaped hook portion 1211 of the first frame strip 121 first enters the recessed portion P2 on one side of the wall portion 1112 of the corresponding fixing portion 111 (the recessed portion P2 is located on the side away from the blocking plate 113). The locking member Fx then passes through the protruding portion P1 and is compressed by the protruding portion P1. The locking member Fx subsequently enters the recessed portion P2 on the other side of the wall portion 1112 of the corresponding fixing portion 111 (the recessed portion P2 is located near the blocking plate 113). Thus, the protruding portion P1 provides a position-limiting function to prevent the locking member Fx from detaching from the recessed portion P2. Meanwhile, the blocking plate 113 also prevents the locking member Fx from disengaging from the fixing portion 111.

This automatic locking structure ensures that after the frame body 12 and the carrier plate 11 are engaged with each other, the two first frame strips 121 of the frame body 12 and the fixing portions 111 of the carrier plate 11 are securely locked to prevent separation. This automatic locking structure effectively enhances the structural stability and safety of the panel light 1.

In addition, in this embodiment, the U-shaped mounting structure formed by the U-shaped fixing portions 111 and the inverted U-shaped first frame strips 121 allows the carrier plate 11 to be combined with the frame body 12 through a simple structural design, significantly reducing the cost of the panel light 1. As a result, the panel light 1 meets the requirements of various applications.

Further, in this embodiment, the panel light 1 has a U-shaped installation structure without mounting holes, such that the carrier plate 11 can be combined with the frame body 12 through a simple structural design and remain concealed within the frame body 12. This results in a more minimalist and aesthetically pleasing appearance for the panel light 1. Thus, the panel light 1 effectively enhances the interior space of buildings, providing users with an excellent experience.

The embodiment just exemplifies the present invention and is not intended to limit the scope of the present invention; any equivalent modification and variation according to the spirit of the present invention is to be also included within the scope of the following claims and their equivalents.

It is worthy to point out that some currently available panel lights are mounted on the ceiling via a ceiling-mounted frame. However, such mounting structures are bulky and heavy, resulting in low installation efficiency and negatively affecting the appearance of the panel light. Besides, the high cost of these mounting structures significantly limits the application of panel lights. Some other currently available panel lights can be installed on the ceiling using a mounting structure that includes a carrier plate and hooks. While this mounting structure improves the appearance compared to ceiling-mounted lights, the installation process is relatively complex, leading to low installation efficiency. Furthermore, this mounting g structure lacks sufficient safety. Additionally, some currently available panel lights can be installed on the ceiling via a metal frame with multiple mounting holes. However, this mounting structure requires several people to complete the installation process, thereby increasing labor costs. Moreover, this structure also affects the appearance of the panel lights. By contrast, according to one embodiment of the present invention, the panel light includes a carrier plate, a frame body and two safety ropes. The carrier plate has two fixing portions disposed at the two ends thereof. The frame body has two first frame strips and two second frame strips spliced with each other. The first frame strips are arranged opposite to each other and corresponding to the fixing portions respectively, and the second frame strips are arranged opposite to each other. Each first frame strip has an L-shaped hook portion, such that the cross-section of the first frame strip is inverted U-shaped, and the L-shaped hook portion has an opening. The safety ropes are corresponding to the first frame strips respectively and corresponding to the fixing portions respectively. The two ends of each safety rope are fixed to the first frame strip and the fixing portion corresponding thereto. When the fixing portions of the carrier plate are disposed at the openings of the L-shaped hook portions of the first frame strips respectively, the safety ropes are in taut state. Each fixing portions is engaged with the L-shaped hook portion of the first frame strip corresponding thereto via the opening of the L-shaped hook portion. The user can first fix the carrier plate to the ceiling and hang the frame body via the two safety ropes, such that the frame body to remain suspended at a distance from the carrier plate. At this point, the user can independently perform a wiring operation, and after completing the wiring operation, assemble the frame body with the carrier plate. This temporary load-bearing structural design significantly simplifies the installation process, so labor costs can be effectively reduced.

According to one embodiment of the present invention, the panel light also has a special automatic alignment structure. When the fixing portions of the carrier plate are disposed at the openings of the L-shaped hook portions of the two first frame strips respectively, the safety ropes are in taut state. Therefore, when the frame body is suspended, the user can move the frame body to ensure that the two safety ropes are taut, such that the fixing portions can enter the openings of the L-shaped hook portions of the two first frame strips. The user can then move the frame body horizontally to engage which with the carrier plate. Therefore, the user can independently perform the assembly process so as to further simplify installation and reducing labor costs.

Also, according to one embodiment of the present invention, the cross-sections of the two first frame strips of the panel light are inverted U-shaped, while the two fixing portions of the carrier plate are U-shaped. The U-shaped installation structure formed by the U-shaped fixing portions and the inverted U-shaped first frame strips allows the carrier plate to combine with the frame body through a simple structural design, which can significantly reduce the cost of the panel light. Thus, the panel light can meet the requirements of various applications.

Further, according to one embodiment of the present invention, the panel light has a special automatic locking structure. Each fixing portion includes an L-shaped supporting portion and a wall portion. The wall portion is connected to the L-shaped supporting portion, and the L-shaped supporting portion is connected to the carrier plate. The wall portion includes a protruding portion and two recessed portions. The protruding portion extends in the direction toward the carrier plate, and the two recessed portions are disposed on the two sides of the protruding portion. Each first frame strip also includes a locking member. The locking member is fixed to the L-shaped hook portion of the first frame strip and engaged with one of the recessed portions of the wall portion of the corresponding fixing portion. This automatic locking structure provides an automatic locking function after the frame body and carrier plate are engaged with each other in order to secure the two first frame strips of the frame body to the fixing portions of the carrier plate. This automatic locking structure prevents the frame body from separating from the carrier plate and effectively enhances the structural stability and safety of the panel light.

Moreover, according to one embodiment of the present invention, the panel light has a junction box matching structure. Via this junction box matching structure, the panel light can accommodate junction boxes of different sizes, such that the panel light can be more flexible in use. Consequently, the panel light achieves greater practicality.

Furthermore, according to one embodiment of the present invention, the panel light features a U-shaped installation structure without mounting holes, enabling the carrier plate to combine with the frame body through a simple structural design and remain concealed within the frame body. As a result, the panel light achieves a more minimalistic and aesthetically pleasing appearance. This effectively enhances the interior space of buildings, providing users with an excellent user experience. As set forth above, the panel light according to the embodiments of the present invention can achieve great technical effects.

Figure 12:
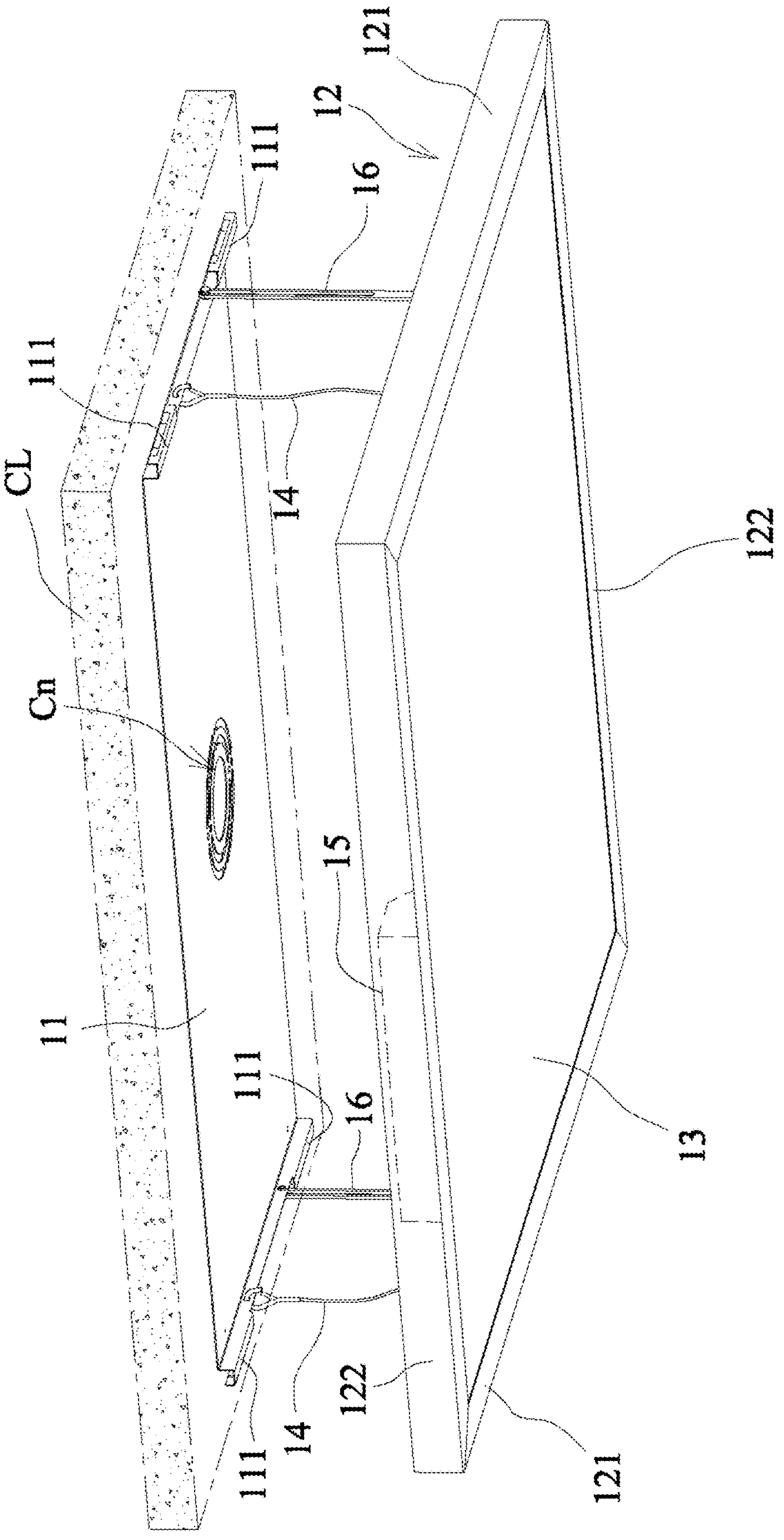
FIG. 12 is an exploded view of a panel light in accordance with another embodiment of the present invention.
Figure 13:
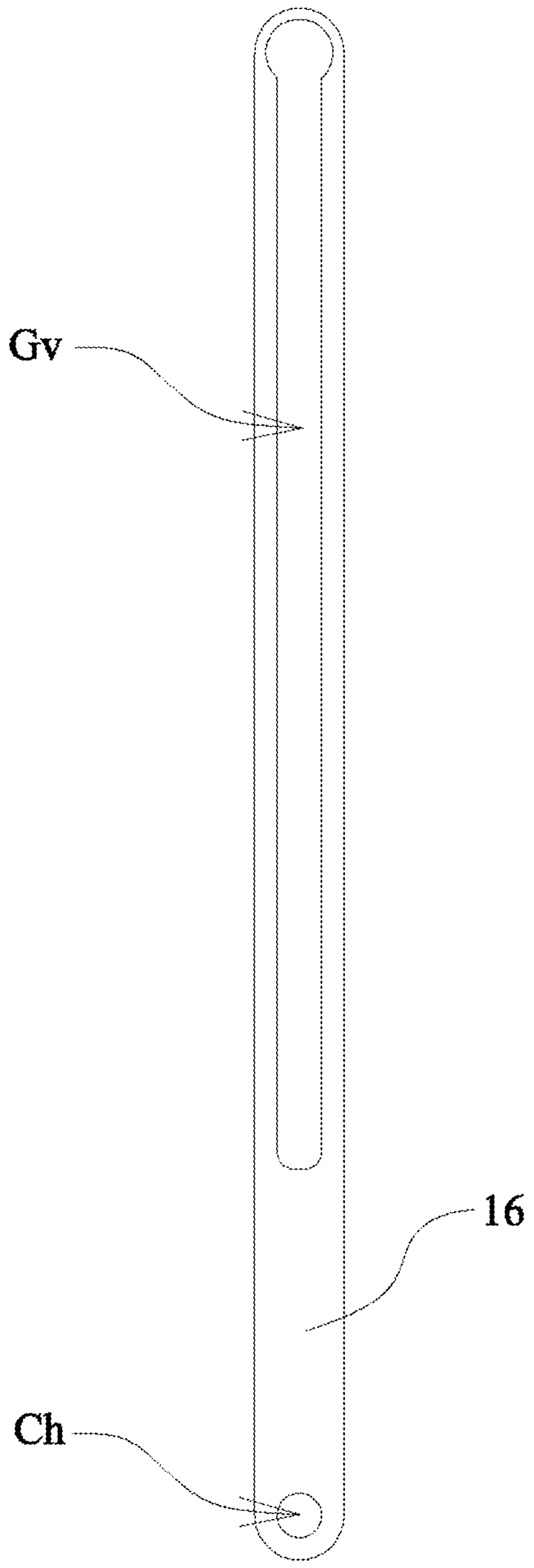
FIG. 13 is a front view of a supporting plate of the panel light in accordance with another embodiment of the present invention.

Please refer to FIG. 12 and FIG. 13. FIG. 12 is an exploded view of a panel light in accordance with another embodiment of the present invention. FIG. 13 is a front view of a supporting plate of the panel light in accordance with another embodiment of the present invention. Please also refer to FIG. 4, FIG. 5, FIG. 9, FIG. 10, and FIG. 11.

As shown in FIG. 12 and FIG. 13, the panel light 1 includes a carrier plate 11, a frame body 12, a lamp body 13, two safety ropes 14, and a power supply module 15. The above elements are the same as those in the previous embodiment and will not be described herein.

The difference between this embodiment and the previous embodiments is that the panel light 1 in this embodiment further includes two supporting plates 16. The two supporting plates 16 are corresponding to the first frame strips 121 of the frame body 12 respectively, and also corresponding to the fixing portions 111 of the carrier plate 11 respectively. The two ends of each supporting plate 16 are fixed to the corresponding first frame strip 121 and fixing portion 111. One end of each supporting plate 16 has a groove Gv, while the other end thereof has a connection hole Ch. The supporting plate 16 is fixed to the corresponding fixing portion 111 via the groove Gv and to the corresponding first frame strip 121 via the connection hole Ch.

When the frame body 12 is in suspended state, the user can move the frame body 12. At this time, the two supporting plates 16 provide automatic guiding and alignment functions, such that the four fixing portions can enter the openings Pn of the L-shaped hook portions 1211 of the two first frame strips 121. When the four fixing portions of the carrier plate 11 are disposed at the openings Pn of the L-shaped hook portions 1211 of the two first frame strips 121, the two supporting plates 16 become parallel to the frame body 12 and the carrier plate 11. The user can then move the frame body 12 horizontally, such that the frame body 12 can be engaged with the carrier plate 11.

As described above, the supporting plates 16 can serve as temporary load-bearing structures while also providing automatic alignment and guiding functions. Through the structural design of the supporting plates 16, the panel light 1 can offer more precise automatic guiding and alignment functions, which can simplify the installation process and reducing labor costs.

The embodiment just exemplifies the present invention and is not intended to limit the scope of the present invention; any equivalent modification and variation according to the spirit of the present invention is to be also included within the scope of the following claims and their equivalents.

According to another embodiment of the present invention, the panel light 1 includes a carrier plate 11 and a frame body 12. The carrier plate 11 has two fixing portions 111 located at the two ends of the carrier plate 11. Each fixing portion 111 is U-shaped and includes an L-shaped supporting portion 1111 and a wall portion 1112 connected to each other. The L-shaped supporting portion 1111 is connected to the carrier plate 11. The wall portion 1112 includes a protruding portion P1 and two recessed portions P2. The protruding portion P1 extends in the direction toward the carrier plate 11, and the two recessed portions P2 are disposed on the two sides of the protruding portion P1. The top end of the protruding portion P1 is flat, while the two sides thereof are slanted. The frame body 12 includes two first frame strips 121 and two second frame strips 122 spliced with each other. The two first frame strips 121 are arranged opposite to each other and corresponding to the two fixing portions 111. The second frame strips 122 are also arranged opposite to each other. Each first frame strip 121 has an L-shaped hook portion 1211 and a locking member Fx, such that the cross-section of the first frame strip 121 is inverted U-shaped. The L-shaped hook portion 1211 has an opening Pn. The locking member Fx is fixed to the L-shaped hook portion 1211 and engaged with one of the recessed portions P2 of the wall portion 1112 of the corresponding fixing portion 111.

According to still another embodiment of the present invention, the panel light 1 includes a carrier plate 11, a frame body 12, and two supporting plates 16. The carrier plate 11 has two fixing portions 111 disposed at the two ends of the carrier plate 11. The fixing portions 111 are U-shaped. The frame body 12 includes two first frame strips 121 and two second frame strips 122 spliced with each other. The two first frame strips 121 are arranged opposite to each other and corresponding to the two fixing portions 111. The two second frame strips 122 are also arranged opposite to each other. Each first frame strip 121 has an L-shaped hook portion 1211, such that the cross-section of the first frame strip 121 is inverted U-shaped. The L-shaped hook portion 1211 has an opening Pn. The two supporting plates 16 are corresponding to the two first frame strips 121 respectively, and also corresponding to the two fixing portions 111 respectively. The two ends of each supporting plate 16 are fixed to the corresponding first frame strip 121 and fixing portion 111. When the two fixing portions 111 of the carrier plate 11 are disposed at the openings Pn of the L-shaped hook portions 1211 of the two first frame strips 121, the two supporting plates 16 become parallel to the frame body 12 and the carrier plate 11. Each fixing portion 111 is engaged with the L-shaped hook portion 1211 of the corresponding first frame strip 121 via the opening Pn of the L-shaped hook portion 1211.

According to yet another embodiment of the present invention, the panel light 1 includes a carrier plate 11, a frame body 12, and a junction box Wb. The carrier plate 11 has two fixing portions 111 disposed at the two ends of the carrier plate 11, a wiring hole Cn, and a plurality of fixing holes. The fixing portions 111 are U-shaped. The fixing holes are arranged around the wiring hole Cn and include a plurality of first fixing holes G1 and a plurality of second fixing holes G2. The centers of the multiple first fixing holes G1 can be connected to form a first circle, while the centers of the multiple second fixing holes G2 can be connected to form a second circle. The diameter of the first circle is different from that of the second circle. The frame body 12 includes two first frame strips 121 and two second frame strips 122 spliced with each other. The two first frame strips 121 are arranged opposite to each other and corresponding to the two fixing portions 111. The two second frame strips 122 are also arranged opposite to each other. Each first frame strip 121 has an L-shaped hook portion 1211, such that the cross-section of the first frame strip 121 is inverted U-shaped. The L-shaped hook portion 1211 has an opening Pn. The junction box Wb is disposed on the carrier plate 11 at a location corresponding to the wiring hole Cn. The junction box is fixed to the carrier plate 11 via the first fixing holes G1 or the second fixing holes G2. The wiring hole Cn communicates with the internal space of the junction box Wb. Each fixing portion 111 is engaged with the L-shaped hook portion 1211 of the corresponding first frame strip 121 via the opening Pn of the L-shaped hook portion 1211.

To sum up, according to one embodiment of the present invention, the panel light includes a carrier plate, a frame body and two safety ropes. The carrier plate has two fixing portions disposed at the two ends thereof. The frame body has two first frame strips and two second frame strips spliced with each other. The first frame strips are arranged opposite to each other and corresponding to the fixing portions respectively, and the second frame strips are arranged opposite to each other. Each first frame strip has an L-shaped hook portion, such that the cross-section of the first frame strip is inverted U-shaped, and the L-shaped hook portion has an opening. The safety ropes are corresponding to the first frame strips respectively and corresponding to the fixing portions respectively. The two ends of each safety rope are fixed to the first frame strip and the fixing portion corresponding thereto. When the fixing portions of the carrier plate are disposed at the openings of the L-shaped hook portions of the first frame strips respectively, the safety ropes are in taut state. Each fixing portions is engaged with the L-shaped hook portion of the first frame strip corresponding thereto via the opening of the L-shaped hook portion. The user can first fix the carrier plate to the ceiling and hang the frame body via the two safety ropes, such that the frame body to remain suspended at a distance from the carrier plate. At this point, the user can independently perform a wiring operation, and after completing the wiring operation, assemble the frame body with the carrier plate. This temporary load-bearing structural design significantly simplifies the installation process, so labor costs can be effectively reduced.

According to one embodiment of the present invention, the panel light also has a special automatic alignment structure. When the fixing portions of the carrier plate are disposed at the openings of the L-shaped hook portions of the two first frame strips respectively, the safety ropes are in taut state. Therefore, when the frame body is suspended, the user can move the frame body to ensure that the two safety ropes are taut, such that the fixing portions can enter the openings of the L-shaped hook portions of the two first frame strips. The user can then move the frame body horizontally to engage which with the carrier plate. Therefore, the user can independently perform the assembly process so as to further simplify installation and reducing labor costs.

Also, according to one embodiment of the present invention, the cross-sections of the two first frame strips of the panel light are inverted U-shaped, while the two fixing portions of the carrier plate are U-shaped. The U-shaped installation structure formed by the U-shaped fixing portions and the inverted U-shaped first frame strips allows the carrier plate to combine with the frame body through a simple structural design, which can significantly reduce the cost of the panel light. Thus, the panel light can meet the requirements of various applications.

Further, according to one embodiment of the present invention, the panel light has a special automatic locking structure. Each fixing portion includes an L-shaped supporting portion and a wall portion. The wall portion is connected to the L-shaped supporting portion, and the L-shaped supporting portion is connected to the carrier plate. The wall portion includes a protruding portion and two recessed portions. The protruding portion extends in the direction toward the carrier plate, and the two recessed portions are disposed on the two sides of the protruding portion. Each first frame strip also includes a locking member. The locking member is fixed to the L-shaped hook portion of the first frame strip and engaged with one of the recessed portions of the wall portion of the corresponding fixing portion. This automatic locking structure provides an automatic locking function after the frame body and carrier plate are engaged with each other in order to secure the two first frame strips of the frame body to the fixing portions of the carrier plate. This automatic locking structure prevents the frame body from separating from the carrier plate and effectively enhances the structural stability and safety of the panel light.

Moreover, according to one embodiment of the present invention, the panel light has a junction box matching structure. Via this junction box matching structure, the panel light can accommodate junction boxes of different sizes, such that the panel light can be more flexible in use. Consequently, the panel light achieves greater practicality.

Furthermore, according to one embodiment of the present invention, the panel light features a U-shaped installation structure without mounting holes, enabling the carrier plate to combine with the frame body through a simple structural design and remain concealed within the frame body. As a result, the panel light achieves a more minimalistic and aesthetically pleasing appearance. This effectively enhances the interior space of buildings, providing users with an excellent user experience.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A panel light, comprising:

a carrier plate having two fixing portions disposed at two ends thereof;

a frame body having two first frame strips and two second frame strips spliced with each other, wherein the first frame strips are arranged opposite to each other and corresponding to the fixing portions respectively, and the second frame strips are arranged opposite to each other, and each of the first frame strips has an L-shaped hook portion, whereby a cross-section of the first frame strip is inverted U-shaped, and the L-shaped hook portion has an opening; and two safety ropes corresponding to the first frame strips respectively and corresponding to the fixing portions respectively, wherein two ends of each of the safety ropes are fixed to the first frame strip and the fixing portion corresponding thereto, wherein when the fixing portions of the carrier plate are disposed at the openings of the L-shaped hook portions of the first frame strips respectively, the safety ropes are in taut state;

wherein each of the fixing portions is engaged with the L-shaped hook portion of the first frame strip corresponding thereto via the opening of the L-shaped hook portion.

2. The panel light as claimed in claim 1, wherein the fixing portions are U-shaped.

3. The panel light as claimed in claim 1, wherein one of the fixing portions has a blocking plate disposed at one end thereof.

4. The panel light as claimed in claim 1, wherein each of the fixing portions comprises an L-shaped supporting portion and a wall portion connected to the L-shaped supporting portion, and the L-shaped supporting portion is connected to the carrier plate.

5. The panel light as claimed in claim 4, wherein the wall portion has a protruding portion extending in a direction toward the carrier plate, and two recessed portions disposed on two sides of the protruding portion.

6. The panel light as claimed in claim 5, wherein each of the first frame strips further comprises a locking member fixed to the L-shaped hook portion thereof and engaged with one of the recessed portions of the wall portion of the fixing portion corresponding thereto.

7. The panel light as claimed in claim 1, further comprising two supporting plates corresponding to the two first frame strips respectively and corresponding to the two fixing portions respectively, wherein two ends of each of the supporting plates are fixed to the first frame strip and the fixing portion corresponding thereto.

8. The panel light as claimed in claim 7, wherein one end of each of the supporting plates has a groove, and the supporting plate is fixed to the fixing portion corresponding thereto via the groove.

9. The panel light as claimed in claim 1, wherein the carrier plate further comprises a wiring hole and a plurality of fixing holes arranged around the wiring hole.

10. The panel light as claimed in claim 1, further comprising a lamp body disposed within the frame body.

11. A panel light, comprising:

a carrier plate having two fixing portions disposed at two ends of the carrier plate, and the fixing portions being U-shaped;

a frame body having two first frame strips and two second frame strips spliced with each other, wherein the first frame strips are arranged opposite to each other and corresponding to the fixing portions respectively, and the second frame strips are arranged opposite to each other, and each of the first frame strips has an L-shaped hook portion, whereby a cross-section of the first frame strip is inverted U-shaped, and the L-shaped hook portion has an opening; and a lamp body disposed within the frame body;

wherein each of the fixing portions is engaged with the L-shaped hook portion of the first frame strip corresponding thereto via the opening of the L-shaped hook portion.

12. The panel light as claimed in claim 11, wherein one of the fixing portions has a blocking plate disposed at one end thereof.

13. The panel light as claimed in claim 11, wherein each of the fixing portions comprises an L-shaped supporting portion and a wall portion connected to the L-shaped supporting portion, and the L-shaped supporting portion is connected to the carrier plate.

14. The panel light as claimed in claim 13, wherein the wall portion has a protruding portion extending in a direction toward the carrier plate, and two recessed portions disposed on two sides of the protruding portion.

15. The panel light as claimed in claim 14, wherein each of the first frame strips further comprises a locking member fixed to the L-shaped hook portion thereof and engaged with one of the recessed portions of the wall portion of the fixing portion corresponding thereto.

16. The panel light as claimed in claim 11, further comprising two safety ropes corresponding to the two first frame strips respectively and corresponding to the fixing portions respectively, wherein tow ends of each of the safety ropes are fixed to the first frame strip and the fixing portion respectively.

17. The panel light as claimed in claim 16, wherein when the fixing portions of the carrier plate are disposed at the openings of the L-shaped hook portions of the first frame strips respectively, the safety ropes are in taut state.

18. The panel light as claimed in claim 16, further comprising two supporting plates corresponding to the two first frame strips respectively and corresponding to the fixing portions respectively, wherein two ends of each of the supporting plates are fixed to the first frame strip and the fixing portion corresponding thereto.

19. The panel light as claimed in claim 18, wherein one end of each of the supporting plates has a groove, and the supporting plate is fixed to the fixing portion corresponding thereto via the groove.

20. The panel light as claimed in claim 11, wherein the carrier plate further comprises a wiring hole and a plurality of fixing holes disposed around the wiring hole.

* * * * *